United States Patent [19]
Sutton et al.

[11] 3,982,205
[45] Sept. 21, 1976

[54] METHOD FOR PRODUCING A LASABLE GASEOUS MIXTURE FOR USE IN AND OPERATION OF ELECTRON BEAM-SUSTAINER STABILIZED CARBON DIOXIDE LASERS

[75] Inventors: George W. Sutton, Lexington; Diarmaid H. Douglas-Hamilton, Boston, both of Mass.

[73] Assignee: Avco Everett Research Laboratory, Inc., Everett, Mass.

[22] Filed: Oct. 17, 1974

[21] Appl. No.: 515,672

[52] U.S. Cl. ............... 331/94.5 G; 331/94.5 P; 330/4.3
[51] Int. Cl.² ............... H01S 3/22; H01S 3/09
[58] Field of Search ............... 331/94.5 PE, 94.5 G; 330/4.3

[56] References Cited
UNITED STATES PATENTS
3,720,885  3/1973  Koloc ............... 331/94.5 G

OTHER PUBLICATIONS

Vallach et al., Applied Physics Letters, 20 (10), May 15, 1972, pp. 395–397.

Primary Examiner—Robert J. Webster
Attorney, Agent, or Firm—Charles M. Hogan; Melvin E. Frederick

[57] ABSTRACT

A method of producing a lasable gaseous mixture for use in and operation of electron beam-sustainer carbon dioxide lasers comprising burning a hydrocarbon fuel to produce substantially oxygen free products of combustion, removing undesirable constituents to leave a gaseous mixture which can support laser oscillation comprising substantially only carbon dioxide, nitrogen and hydrogen, collecting the resulting gaseous mixture, and thereafter supply and use it as the active medium in an electron beam-sustainer laser.

12 Claims, 1 Drawing Figure

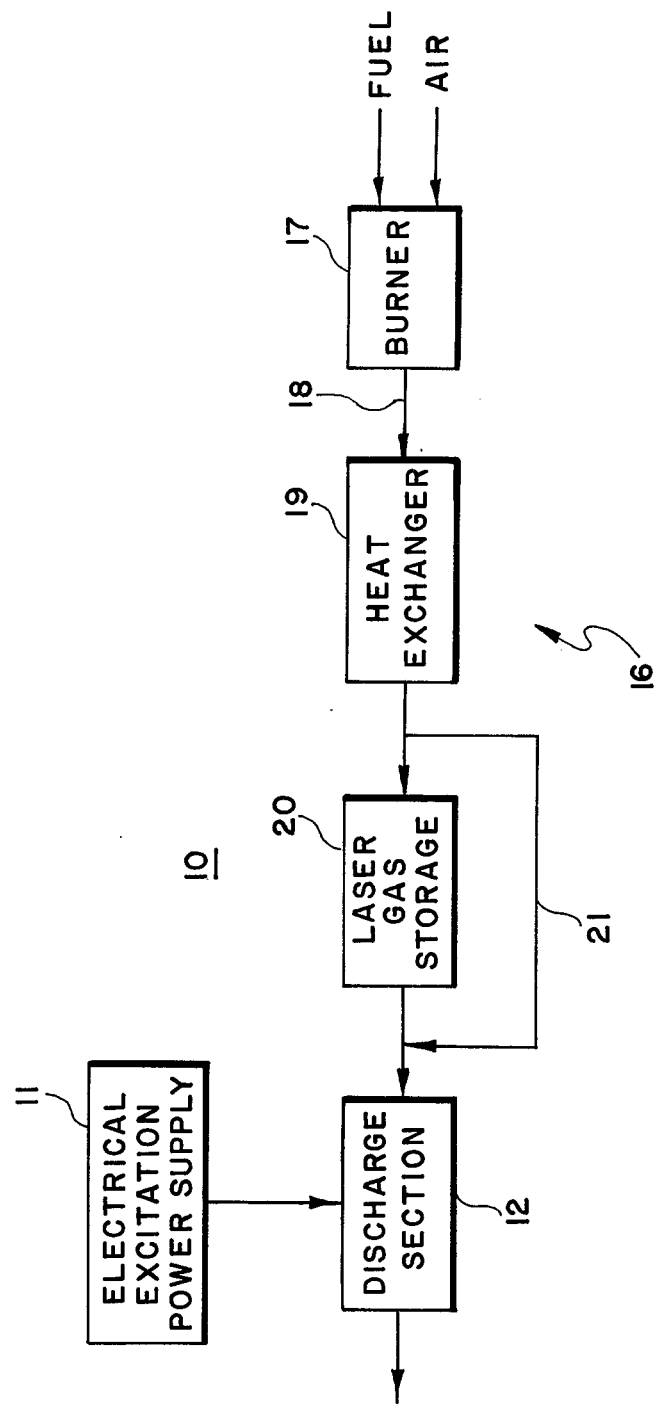

3,982,205

METHOD FOR PRODUCING A LASABLE GASEOUS MIXTURE FOR USE IN AND OPERATION OF ELECTRON BEAM-SUSTAINER STABILIZED CARBON DIOXIDE LASERS

BACKGROUND OF THE INVENTION

The present invention relates to the production of an active gaseous mixture which can support laser oscillation for and the use of such mixture in a laser, and in particular burning a hydrocarbon fuel with air to produce the active gaseous mixture for electric lasers.

In recent years, substantial progress has been made in the development of high power $CO_2$ lasers in which the active gaseous medium flows through the working region in either the open or closed cycle CW or pulsed mode for flowing gas lasers or is sequentially replaced for the open or closed pulsed cycle mode of operation.

Electrically excited convection cooled $CO_2$ lasers appear to offer the greatest potential for applications requiring either high average power or high peak power. The very high power capability of $CO_2$ lasers (lasers however pumped using a gaseous lasing mixture including $CO_2$) was first demonstrated with the gas dynamic type which does not utilize electrical excitation or pumping. For a comprehensive discussion of the gas dynamic type laser including devices utilizing specific products of combustion, reference is made to U.S. Pat. No. 3,713,030, incorporated herein as if set out at length. See, also, "Gas Dynamic Lasers" by E. T. Gerry, *American Physical Society Bulletin*, Series II, Vol. 15, No. 4, p. 563, April 1970 and "Gas Dynamic Lasers" by E. T. Gerry, IEEE spectrum, pp. 51–58, November 1970; and "Performance of an Unstable Oscillator on a 30 cw Gas Dynamic Laser" by E. V. Locke, R. Hella, and L. Westra, Avco Everett Research Laboratory, *IEEE Journal of Quantum Electronics*, Vol. QE-7, pp. 581–583, December, 1971. However, electrically excited lasers and especially electrically excited convection cooled $CO_2$ lasers appear to be better suited than gas dynamic lasers for many applications such as, for example, laser fusion work, heat treating, welding and cutting.

Of the many types of lasers under development such as, for example the HF/DF lasers and CO lasers, $CO_2$ lasers have the benefit of earlier and far greater development efforts. Further, over the past several years, research and development efforts hve been concentrated on electrically excited convection cooled $CO_2$ lasers operating in both the open and closed gas cycle mode. Such lasers that utilize a single large discharge volume appear to be best suited for use in high power laser systems because such lasers offer, among other things, a clean aerodynamic design, minimum ducting, low pressure loss in the laser channel, a uniform active medium and high output power.

For a description of one type of such laser, reference is made to U.S. Pat. No. 3,721,915 and for a detailed description of the electron beam-sustainer stabilized type laser, reference is made to U.S. Pat. No. 3,702,973, incorporated herein as if set out at length.

The output power of the above-noted electron beam-sustainer stabilized lasers have been made very large and can be made as large as one might reasonably desire. What is necessary in such lasers is the provision of efficient uniform and high power electrical excitation of the gas volume, a high energy density, and uniform optical quality. The electron beam-sustainer stabilized laser solves all of the above problems and can provide uniform electrical discharges in large gas volumes at from subatmospheric pressures to atmospheric pressure and above. At the volumes and pressures readily available with electron beam-sustainer stabilized lasers, application of an electric field alone to pump a lasable gas or gas mixture to produce a self-sustaining discharge in the gas quickly leads to formation of high-current constricted arcs.

In accordance with the teaching of the aforementioned U.S. Pat. No. 3,713,030, a plasma and especially a lasable gaseous mixture is stabilized through substantially its entire volume even at pressures greater than atmospheric by making the electron-ion production mechanism in the plasma independent of the electromagnetic field through the use of an external ionization source such as a large area, high energy electron beam. The separation of the electron-ion production mechanism from the applied electric field permits the electric field applied to be much lower than that otherwise required for self-sustaining discharges.

Thus, plasma stabilization by this technique permits large volumes of laser gas to be efficiently and effectively electrically pumped to produce optimum population inversion and high output power. Lasers operating in accordance with this technique not surprisingly have come to be called electron beam-sustainer stabilized lasers.

Electron beam-sustainer stabilized lasers are inherently capable of providing a very high output power. However, heretofore the production of such output power with such lasers required the provision of large volumes of laser gas comprising commercial grade carbon dioxide, nitrogen and helium. In the forms presently available, such gases not only are very costly per se, but also require substantial storage space depending on the rate of use and laser output power provided. Further, the storage means for these gases are very heavy, especially as compared to the weight of the gases alone.

SUMMARY OF THE INVENTION

We have found that operation of electron beam-sustainer stabilized $CO_2$ lasers may be obtained with a lasable gaseous mixture comprising substantially only carbon dioxide, nitrogen and hydrogen in the ratio obtained from the combustion of conventional hydrocarbon fuels with air for and in the manner set forth herein.

This eliminates the need for a plurality of separate gas supplies and/or premixing, and greatly reduces, where associated with the laser, the weight and size of the gas supply. Further, whether directly associated with the laser or not, the cost of the lasable gas mixture may be greatly reduced. The produced mixture, while different than that produced or used, for example, for $CO_2$ gas dynamic lasers and/or used in prior electron beam-sustainer stabilized lasers, can be used at room temperature or be cooled prior to use. At room temperature, the produced gaseous mixture which can support laser oscillations can produce up to 25–30 kJ/lb. When precooled to, for example, about 200°K, it may produce about 40 to 50 kilojoules per pound of laser gas, only about 0.07 pounds of fuel being needed to produce one pound of laser gas. This can result in a net laser specific energy of up to about 500 kJ/lb. of fuel, an improvement of a factor of about 500 over early gas dynamic lasers and a factor of 2 to 10 over chemical lasers.

The high specific laser energies available in accordance with the invention greatly improves the potential for the use of electron beam-sustainer stabilized lasers by now making possible a practical, high power electron beam-sustainer stabilized laser system without any special logistical considerations or other breakthroughs or improvements in laser research. Thus, production of gaseous mixtures which can support laser oscillations and/or operation of lasers in accordance with the present invention have many advantages over prior art techniques and laser devices. The necessity of supplying or storing helium or an exotic laser fuel is eliminated. Only common hydrocarbon fuels and air are needed, air, of course, being substantially everywhere present and free.

Potential laser specific energy may be expected to exceed by a factor of about 2 the highest potential value for other high specific energy lasers such as, for example, chemical lasers.

Potential laser specific energy may also be expected to exceed that of air-breathing $N_2$-$CO_2$ gas dynamic lasers by a factor of about 10 or more.

The energy released by the combustion process in generating gaseous mixtures which can support laser oscillations in accordance with the invention may be used to further increase laser efficiency and mobility and to refrigerate the mixture for example, to about 200°K prior to use so that the full potential of the mixture can be realized. Because of the higher specific laser energy of the mixture, the size of any compressor forming part of an overall system may be smaller by a factor of about 10 or more than that required by air-breathing combustion driven gas dynamic laser concepts.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

BRIEF DESCRIPTION OF THE DRAWINGS

The drawing is a schematic illustration of apparatus operable in accordance with the invention.

Referring now to the drawing, there is shown in schematic form a typical convection cooled electric discharge $CO_2$ laser, generally indicated by the reference character 10, operable in accordance with the present invention. Such a laser may comprise laser gas supply or generator means 16 and suitable electrical excitation power supply means 11 for providing an electric discharge in the discharge section or working region 12, producing in conventional manner the desired population inversion in the laser gases flowing therethrough.

The discharge section 12 may be constructed in a variety of ways and the two-step electrical discharge produced therein in a variety of ways. One type of discharge section and method of and apparatus for producing an electrical discharge is broadly discussed in the aforementioned U.S. Pat. No. 3,721,915. An electron beam-sustainer stabilized discharge section is broadly discussed in the aforementioned U.S. Pat. No. 3,702,973. A closed-cycle version is discussed in U.S. Pat. No. 3,810,043, the contents of which is incorporated herein as if set out at length.

DESCRIPTION OF THE INVENTION

The laser gas supply or generator means 16 may typically comprise a burner 17 for receiving air and a conventional hydrocarbon fuel such as, for example, gasoline, kerosene, fuel oil, JP-4, JP-5, etc. The fuel (JP-4, for example) is burned in the burner with 100% or less (85-90%) theoretical air, to produce substantially oxygen-free hot products of combustion 18 at the outlet of the burner. The products of combustion are then directed via a conventional sealed conduit or the like (not shown) to heat exchanger means 19. The burner means 17 may take any one of a variety of forms. For example, it may comprise a conventional oil burner (preferably with separate conventional controls for controlling the fuel/air ratio), a conventional gas turbine with after burner, a regenerative gas turbine or other suitable thermodynamic engine.

Suitable resulting products of combustion exiting from the burner are by way of example set forth in Table I below.

TABLE I

Combustion Products, Air/Hydrocarbon Mixtures 85% Theoretical Air

| Major Constituents | Percent by Volume |
|---|---|
| $N_2$ | 69.5% |
| $CO_2$ | 9% |
| CO | 5% |
| $H_2O$ | 15% |
| $H_2$ | 1.5% |
| Trace Species | Maximum parts per million by Volume |
| Smoke | 4 to 50 ppm |
| Total unburned hydrocarbon | 100 |
| NO | 1000 |
| OH | 500 |
| H | 400 |
| $NO_2$ | 60 |
| $O_2$ | 10 |
| $SO_2$, $SO_3$ | 10 |
| O | 5 |
| N | .03 |

The typical composition of air is set forth in Table II below.

TABLE II

| Molecule | Composition of Air ppm by Volume |
|---|---|
| $N_2$ | $7.808 \times 10^5$ |
| $O_2$ | $2.095 \times 10^5$ |
| A | 940 |
| $CO_2$ | 330 |
| $H_2$ | 100 |
| Ne | 12 |
| He | 4 |
| $CH_4$ | 1.6 |
| $N_2O$ | 0.28 |
| CO | 0.074 |

Molecular oxygen is capable of being deleterious to laser operation through the reaction $e + O_2 \rightarrow O^- + O$, which removes electrons.

Regarding the constituents of the products of combustion as indicated in Table I, where desired or appropriate the $CO_2$ content may be increased so that $N_2:CO_2$ is about 6:1 by burning closer to theoretical air. Alternatively, the use of Co as a fuel will give a ratio of about 1.88:1, or the use of C as a fuel will give a ratio of about 3.76:1. Thus considerable flexibility is available in selecting $N_2 : CO_2$ molar ratios. A CO content of about 5% is acceptable as indicated in Table I since some $N_2$ can be interchanged with CO. Further, a water vapor concentration of 15% at the outlet of the burner does not exist after cool-down to temperatures of 300°K to 200°K; water concentration at these temperatures may be expected to be in the range of 3.5% to 2.5% ppm. The indicated hydrogen content of 1.5% is almost exactly the amount required for proper deactivation of the lower $CO_2$ laser state and is easily adjusted by adjustment of the fuel-air mixture. A smoke content of about 4 to 50 ppm may be expected with low temperature (leaner) combustion. Any residual smoke acts as condensation centers for water and will be removed with the water. A hydrocarbon level of 100 ppm is not exceptionally high. However, except for $C_2H_2$ and $CH_4$, the hydrocarbons may be expected to recombine and condense. $NO_2$, $SO_2$, and $SO_3$ may also be expected to condense and the (H, OH), O, and N will recombine during the cooldown of the laser gas.

Based on an analysis of electron recombination and attachment in electrical discharge lasers, Table III below shows for trace species which do not condense, have high electron affinities, and have known attachment rate constraints, a comparison of maximum expected to maximum allowable impurities.

TABLE III

|        | Maximum Expected | Maximum Allowable |
|--------|------------------|-------------------|
| O      | 5 ppm            | 160 ppm           |
| $O_2$  | 10               | 100               |
| $O_3$  | —                | 200               |
| OH     | 50*              | 200               |
| NO     | 1000             | 1000              |
| $NO_2$ | 60               | 100               |
| $SO_2$ | 10               | 500               |

*After 0.5 m sec at 300°K

The products of combustion exiting from the heat exchanger for effecting removal of undesirable constituents as discussed above, may, depending on circumstances be directed to conventional gas storage means 20 for storage, for example, at high pressure for subsequent use as the active medium for an electron beam-sustainer laser. Alternately, these products of combustion can be supplied directly to the laser as suggested by the arrow 21 in the drawing.

As will now be evident in accordance with the invention, a lasable gaseous medium for use as the active medium for $N_2$-$CO_2$ electric lasers may be produced by burning a conventional hydrocarbon fuel ($C_xH_y$). The combustion is preferably fuel-rich so that substantially no free oxygen exists in the exhaust product. In the case of a turbine, for example, this may be accomplished by use of an after burner because the primary burner operates with approximately 300–400% excess air to maintain acceptably low turbine inlet temperatures.

A suitable gas mixture was produced and used to provide laser action in the following manner. JP-4 fuel was burned in a modified industrial burner with separate controls for the fuel and combustion air supply to obtain the desired fuel/air ratio. A water-cooled probe projecting into the exhaust gas flow was provided approximately 25 inches from the fuel nozzle to extract exhaust gas samples. Directly after the probe, a water-cooled heat exchanger was provided to reduce the exhaust gas temperature to near ambient. Following the heat exchanger was a U-Tube water trap and condensate drain. Immediately following the water trap was a sampling port where gas could be withdrawn for analysis on a gas chromatograph. The exhaust gases were then passed through a dry ice bath for further removal of water. The dry ice bath consisted of four 16 inch diameter turns of 1 inch diameter copper tubing filled with copper wool. This assembly was immersed in a container filled with dry ice. After leaving the dry ice bath, the products of combustion were then transported through approximately 125 feet of high density polyethylene tubing to the inlet of a Corblin diaphragm type compressor, the compressor discharge being connected to a Type 1A gas cylinder.

An analysis taken just prior to collecting the gas was as follows:

| | |
|---|---|
| $H_2$ | 2.20% |
| $N_2$ | 76.40% |
| $O_2$ | 0 |
| CO | 5.35% |
| $CO_2$ | 9.18% |

The burner was operated until the gas pressure in the collecting cylinder registered 500 psig. Subsequently, the gas in the collecting cylinder was analyzed and the following found:

| | |
|---|---|
| $H_2$ | 2.20% |
| $N_2$ | 79.80% |
| $O_2$ | 1.24% |
| CO | 5.35% |
| $CO_2$ | 9.32% |

It is believed that the $O_2$ resulted from a leak or some other source during collection of the gas. However, this $O_2$ while undesirable, was not found to prevent lasing action when the gas was used as the active medium in an electron beam-sustainer laser device.

A synthetic gas mixture corresponding as close as possible to the combustion products of JP-4 in air was made and tested. The possible presence of nitrogen oxides in the combustion products was anticipated and simulated by adding 1000 ppm of NO to the gas. The composition used was $H_2$:$N_2$:CO:NO 0.18:8.2:1:0.6:0.01 by molar fraction.

This gas mixture was used in an electron beam-sustainer device located and known at the Avco Everett Research Laboratory, Everett, Massachusetts, as the "microbang." The gas mixture was used in order to test the properties of the discharge. It was found that an electron beam sustained discharge could be maintained with sufficiently low electron attachment loss-rate $\beta$ and a sufficiently high electron density $n_e$; numerically $\beta \sim 2 \times 10^5 \text{sec}^{-1}$ and $n_e \sim 3 \times 10^{11}$.

The combustion products produced by burning JP-4 fuelrich as described hereinabove were then introduced into the same discharge cavity and under similar conditions a higher electron density (corresponding to a lower value of $\beta$) was obtained. This established that the requisite electron beam-sustained discharge can be maintained in appropriate combustion product gas. Theoretical prediction showed that this gas should support efficient laser operation.

Laser operation was achieved by using a further quantity of the same gas referred to above in an electron beam-sustained laser having an approximate working region of dimension 4 × 4 × 100 cm operating at 1 atm. in which gain in the gas of 0.8%/cm was measured at 295°K. This proved that the gas would support lasing oscillation. In a second test on the same laser, a still further quantity of the same gas was introduced at atmospheric pressure and refrigerated to near 200°K. Using an unstable oscillator optical cavity (output coupling 40%), a specific output greater than 50 j/liter of laser energy per pulse was measured in gas. Numerically, during the pulse the field:density ratio was $E/N = 2.3 \times 10^{-16}$ V cm$^2$, the electron density $n_e = 3 \times 10^{-12}$ cm$^{-3}$, and pulse duration was 23 $\mu$ sec.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A method of preparing an active medium for gas laser devices which comprises the steps of:
   a. burning a hydrocarbon fuel in the presence of air under conditions to consume at least substantially all the oxygen to produce products of combustion comprising at least carbon dioxide, nitrogen and hydrogen;
   b. cooling said products of combustion to a temperature to at least effect condensation of water vapor in said products of combustion for removal of condensable matter in said products of combustion; and
   c. collecting the remainder of said cooled products of combustion for supply to a laser as the active medium therefor.

2. The method as defined in claim 1 wherein said collected products of combustion include carbon monoxide and trace amounts of oxygen.

3. The method as defined in claim 2 wherein said collected products of combustion also include trace amounts of smoke, unburned hydrocarbon, NO, OH, H, NO$_2$, O$_2$, SO$_2$, SO$_3$, O and N.

4. The method as defined in claim 1 wherein said products of combustion prior to cooling include water vapor and at least substantially all of said water vapor is removed prior to collection of said remainder of said products of combustion.

5. The method as defined in claim 1 wherein said collected products of combustion comprise about two percent by volume of hydrogen, about eighty percent by volume of nitrogen, about nine percent by volume of carbon dioxide, and about six percent by volume of carbon monoxide.

6. The method as defined in claim 1 wherein said hydrocarbon fuel has the formula C$_x$H$_y$ and is burned with less than 100% theoretical air.

7. The method as defined in claim 1 wherein said hydrocarbon fuel has the formula C$_x$H$_y$, said fuel is first burned with more than 100% theoretical air to produce oxygen rich products of combustion, and thereafter a further quantity of fuel is introduced into said oxygen rich products of combustion to provide further combustion and consume substantially all of the oxygen in said oxygen rich products of combustion.

8. A method of preparing an active medium for gas laser devices which comprises the steps of:
   a. burning a hydrocarbon fuel in the presence of air under conditions to consume at least substantially all the oxygen to produce products of combustion comprising at least carbon dioxide, nitrogen and hydrogen;
   b. separating from said products of combustion said carbon dioxide, nitrogen and hydrogen to produce a gas mixture capable of producing laser action in an electron beam-sustainer laser; and
   c. collecting said carbon dioxide, nitrogen and hydrogen for supply to a laser as the active medium therefor.

9. A method of preparing an active medium for electrical discharge gas laser devices which comprises the steps of:
   a. burning a fuel containing the element carbon in the presence of air under conditions to consume at least substantially all the oxygen to produce products of combustion comprising at least carbon dioxide, nitrogen and hydrogen;
   b. separating from said products of combustion said carbon dioxide, nitrogen and hydrogen to produce a gas mixture capable of producing laser action in an electrical discharge laser; and
   c. collecting said carbon dioxide, nitrogen and hydrogen for supply to a laser as the active medium therefor.

10. The method as defined in claim 8 wherein the fuel burned also contains the element hydrogen.

11. A method of operating flowing gas laser devices which comprises the steps of:
   a. burning a hydrocarbon fuel in the presence of air under conditions to consume at least substantially all the oxygen to produce products of combustion comprising at least carbon dioxide, nitrogen and hydrogen;
   b. cooling said products of combustion to a temperature to at least effect condensation of water vapor in said products of combustion for removal of condensable matter in said products of combustion;
   c. collecting the uncondensed cooled products of combustion;
   d. causing said collected products of combustion to flow through a working region where a population inversion is produced;
   e. exciting said products of combustion in said working region to produce a population inversion by causing an electrical discharge to be maintained in said products of combustion in said working region by separately ionizing said products of combustion and applying a voltage across said products of combustion in said working region to produce current flow through said products of combustion in said working region; and
   f. stimulating emission of radiation from said products of combustion.

12. A flowing gas laser device comprising:
   a. burner means for burning a hydrocarbon fuel in the presence of air under conditions to consume at least substantially all the oxygen to produce products of combustion comprising at least carbon dioxide, nitrogen and hydrogen;
   b. heat exchanger means for cooling said products of combustion to a temperature to at least effect condensation of water vapor in said products of combustion for removal of condensable matter in said products of combustion;

c. first means for collecting the remainder of said cooled products of combustion;
d. second means defining a cavity having a working region disposed therein where a population inversion is produced;
e. third means for causing said products of combustion to flow through said working region;
f. fourth means for exciting said products of combustion in said working region to produce a population inversion by causing an electrical discharge to be maintained in said products of combustion in said working region by separately ionizing said products of combustion and applying a voltage across said products of combustion in said working region to produce current flow therethrough; and
g. fifth means for stimulating emission of radiation from said products of combustion.

\* \* \* \* \*

UNITED STATES PATENT AND TRADEMARK OFFICE
CERTIFICATE OF CORRECTION

PATENT NO. : 3,982,205
DATED : September 21, 1976
INVENTOR(S) : George W. Sutton and Diarmaid H. Douglas-Hamilton It is certified that error appears in the above-identified patent and that said Letters Patent are hereby corrected as shown below:

Column 1, line 48, for "hve", read --have--; and Column 6, line 45, for "$H_2:N_2:CO:NO$", read --$H_2:N_2:CO_2:CO:NO$--.

Signed and Sealed this

Eleventh Day of January 1977

[SEAL]

Attest:

RUTH C. MASON
*Attesting Officer*

C. MARSHALL DANN
*Commissioner of Patents and Trademarks*